(12) United States Patent
Duraisamy et al.

(10) Patent No.: US 12,537,854 B2
(45) Date of Patent: Jan. 27, 2026

(54) TOKEN-BASED SESSION ESTABLISHMENT FOR CLIENT COMPUTING DEVICES

(71) Applicant: CITRIX SYSTEMS, INC., Fort Lauderdale, FL (US)

(72) Inventors: Pary Duraisamy, Karnataka (IN); Georgy Momchilov, Parkland, FL (US); Kenneth Bell, Santa Clara, CA (US); Leo C. Singleton, IV, Fort Lauderdale, FL (US); Lin Cao, Fort Lauderdale, FL (US); Mukund Ingale, Fort Lauderdale, FL (US); Kuldeep Singh, Karnataka (IN)

( * ) Notice: Subject to any disclaimer, the term of this patent is extended or adjusted under 35 U.S.C. 154(b) by 903 days.

(21) Appl. No.: 17/457,992

(22) Filed: Dec. 7, 2021

(65) Prior Publication Data

US 2023/0179632 A1    Jun. 8, 2023

(51) Int. Cl.
*H04L 9/40* (2022.01)
*H04L 9/32* (2006.01)
*H04L 12/66* (2006.01)

(52) U.S. Cl.
CPC ............ *H04L 63/18* (2013.01); *H04L 9/3236* (2013.01); *H04L 12/66* (2013.01); *H04L 63/08* (2013.01)

(58) Field of Classification Search
CPC ....... H04L 63/18; H04L 9/3236; H04L 12/66; H04L 63/08; H04L 9/3213; H04L 9/3239; H04L 63/0807

USPC .............................................................. 726/9
See application file for complete search history.

(56) References Cited

U.S. PATENT DOCUMENTS

| 9,948,610 | B2 | 4/2018 | Broadbent et al. |
| 12,101,319 | B2 * | 9/2024 | Momchilov ........ H04L 63/0853 |
| 2020/0371829 | A1 | 11/2020 | Momchilov |
| 2021/0218571 | A1 * | 7/2021 | Ansari ................ H04M 15/705 |
| 2022/0417240 | A1 * | 12/2022 | Zhang ................. H04L 41/0895 |

FOREIGN PATENT DOCUMENTS

| EP | 3 138 257 | | 3/2017 | |
| EP | 4123962 | A1 * | 1/2023 | ......... H04L 63/0823 |
| WO | WO-2023272419 | A1 * | 1/2023 | ......... G06F 9/45558 |

* cited by examiner

*Primary Examiner* — Aubrey H Wyszynski

(57) ABSTRACT

A method may include, at a computing device, receiving a token from an appliance operating as a gateway between a client computing device and the computing device, the token being generated based upon a key of the computing device, and establishing a first connection with the appliance based upon the token, with the first connection being persistent. The method may further include, at the computing device, receiving a request from the appliance via the first connection, the request being for a remote session, and responsive to receipt of the request, establishing a second connection with the appliance that enables the client computing device to access the session.

18 Claims, 16 Drawing Sheets

TOKEN-BASED SESSION ESTABLISHMENT FOR CLIENT COMPUTING DEVICES

BACKGROUND

Many organizations are now using applications to provide a more flexible option to address the varying needs of their users. In desktop virtualization, a user's operating system, applications, and/or user settings may be separated from the user's physical smartphone, laptop, or desktop computer. Using client-server technology, a "virtualized desktop" may be stored in and administered by a remote server, rather than in the local storage of a client computing device.

There are several different types of desktop virtualization systems. Virtual Desktop Infrastructure (VDI) refers to the process of running a user desktop inside a virtual machine that resides on a server. Virtualization systems may also be implemented in a cloud computing environment in which a pool of computing desktop virtualization servers, storage disks, networking hardware, and other physical resources may be used to provision virtual desktops, and/or provide access to shared applications.

SUMMARY

A method may include, at a computing device, receiving a token from an appliance operating as a gateway between a client computing device and the computing device, with the token being generated based upon a key of the computing device, and establishing a first connection with the appliance based upon the token, with the first connection being persistent. The method may further include, at the computing device, receiving a request from the appliance via the first connection, the request being for a remote session, and responsive to receipt of the request, establishing a second connection with the appliance that enables the client computing device to access the session.

In an example embodiment, the appliance may comprise a plurality of appliances distributed across different geographical regions, and establishing may comprise establishing the first connection with a first appliance in a geographical region closest to the computing device from among the different geographical regions. Furthermore, the client computing device may communicate with a second appliance, and establishing may comprise establishing the second connection with the second appliance, for example. In accordance with an example implementation, the first and second appliances may communicate via a first network overlayed on a second network.

In one example implementation, the method may further include, at the computing device, registering the computing device with a broker with which the appliance is also registered, and receiving may comprise receiving the token from the appliance via the broker. By way of example, the token may include a hash of the key for the computing device. In an example implementation, the appliance may comprise a plurality of appliances distributed across different geographical regions, and the method may include, at the computing device, determining a location of the client computing device and establishing the second connection with the appliance in a geographical region closest to the determined location from among the different geographical regions.

In accordance with another example, the appliance and the computing device may be configured to establish connections via a plurality of different networking protocols, and establishing may comprise establishing the second connection using a same network protocol used for a connection between the client computing device and the appliance. In yet another example implementation, the method may also include, at the computing device, receiving a connection lease from the client device via the second connection with the appliance, and providing access to computing sessions requested by the client computing device based upon validating the connection lease.

A related computing device may include a memory and a processor configured to cooperate with the memory to receive a token from an appliance operating as a gateway between a client computing device and the computing device, with the token being generated based upon a key of the computing device, and establish a first connection with the appliance based upon the token, with the first connection being persistent. The processor may further receive a request from the appliance via the first connection, the request being for a remote session, and responsive to receipt of the request, establish a second connection with the appliance that enables the client computing device to access the session.

A related non-transitory computer-readable medium may have computer-executable instructions for causing a computing device to perform steps including receiving a token from an appliance operating as a gateway between a client computing device and the computing device, with the token being generated based upon a key of the computing device, and establishing a first connection with the appliance based upon the token, with the first connection being persistent. The steps may further include receiving a request from the appliance via the first connection, with the request being for a remote session, and responsive to receipt of the request, establishing a second connection with the appliance that enables the client computing device to access the session.

DETAILED DESCRIPTION

Figure 1:
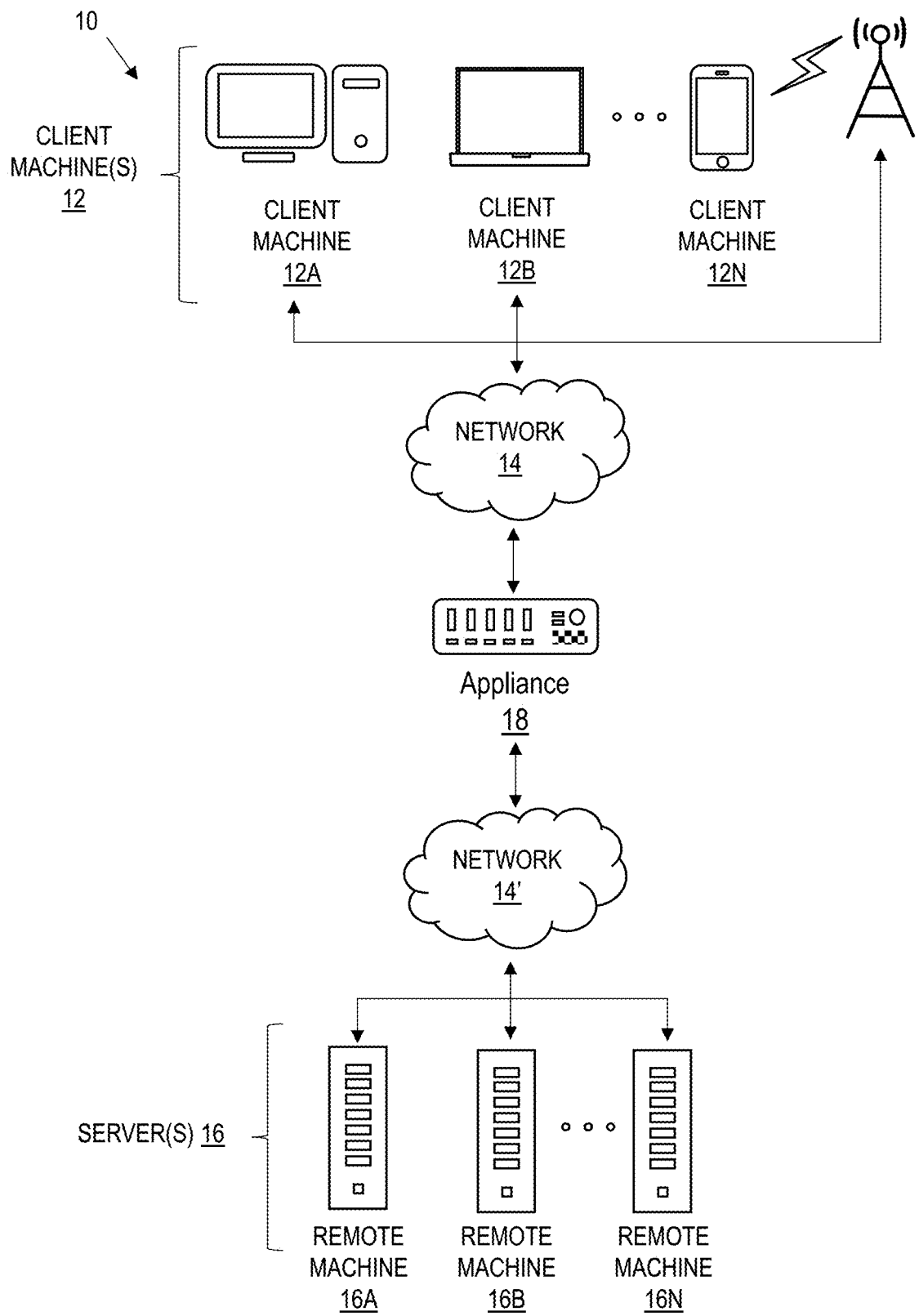
FIG. 1 is a schematic block diagram of a network environment of computing devices in which various aspects of the disclosure may be implemented.

Virtual delivery appliances allow client devices to be connected with computing sessions or resources. In some implementations, virtual delivery appliances may be utilized on-premises at a corporation's or organization's data center to allow for remote connections by client devices to backend servers. The client devices can connect to the virtual delivery appliances from different locations through a gateway (e.g., a cloud gateway service). When there are multiple on-premises or backend virtual delivery appliances, an agent (e.g., a backend agent) may be used to establish connections to the computing appliances (e.g. backend VDAs) based on incoming connection requests from the gateway.

However, having an agent as the distribution point for connections to appliances may result in bottlenecks. More particularly, the agent may introduce increased latency due to an extra network hop, as well as increased complexity and consumption of resources to maintain hardware with high availability and scaling up/down based on bandwidth. Furthermore, the agent and cloud services, e.g. cloud gateway service, are to trust one another. The cloud services can also support auto updates to the agent. However, auto updates to the agent may also cause problems with connections to the virtual delivery appliances, e.g., if connections from the gateway are lost during an update, thus resulting in bad user experience. Moreover, to reduce complexity and consumption of resources to deploy additional machines, agents may sometimes be used for other purposes in the customer environment, such as services for connecting to a directory service, machine provisioning, etc., which, in case of extra load by these additional services, can add additional latency issues. In addition, when the agent is joined to the directory service, the backend virtual delivery appliance may be required to join a domain too, which adds additional requirements and complexity. Further, to ensure end-to-end network-level encryption, a customer administrator may be required to manage Transport Layer Security (TLS) policies and deploy root certificates to virtual delivery appliances, a further burden on IT personnel.

The devices and methods described herein overcome these technical challenges by establishing a first connection between a cloud service acting as a gateway and a virtual delivery appliance (e.g., a backend virtual delivery appliance) that is persistent (in that it remains open and may be used for a set time) based upon a token, as one example. The first connection may serve as a persistent control connection between the cloud service and the virtual delivery appliance over which the virtual delivery appliance receives connection requests for remote sessions from client devices. Upon receiving a connection request, the virtual delivery appliance establishes a second connection with the cloud service that enables the client computing device to access the session. This establishes a tunnel between the client device, cloud gateway and virtual delivery appliance in the customer environment without the need for an agent. In another example embodiment, digital certificates could be used, although certificates may require more complex and costly Public Key Infrastructure (PKI) setup, along with Root Certificate Authority (CA), subordinate and intermediate CAs, certificate deployment, revocation, etc., thus making the signed token and public keys approach described in detail below a relatively simpler, more lightweight yet still secure mechanism for connection authorization.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
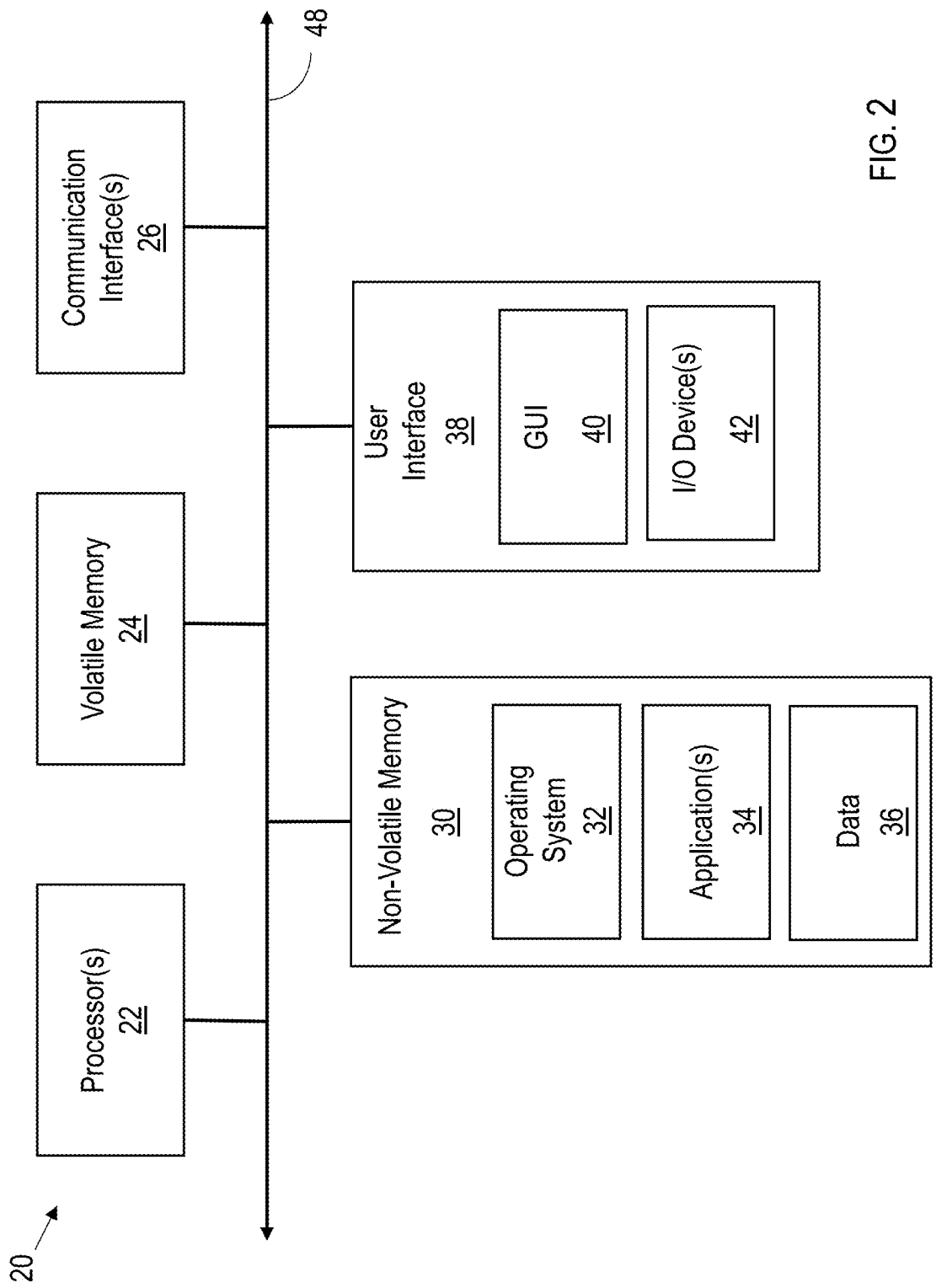
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
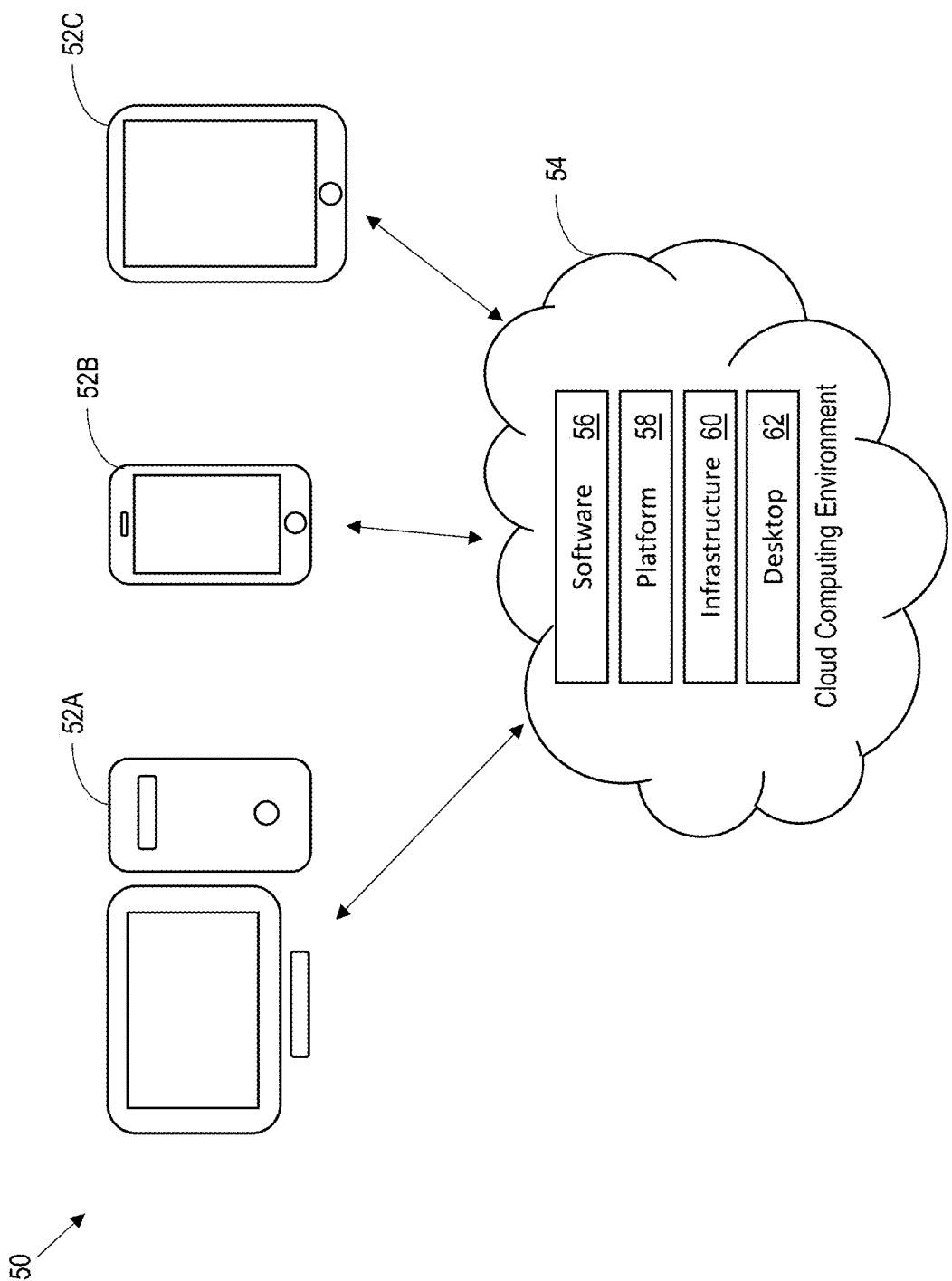
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
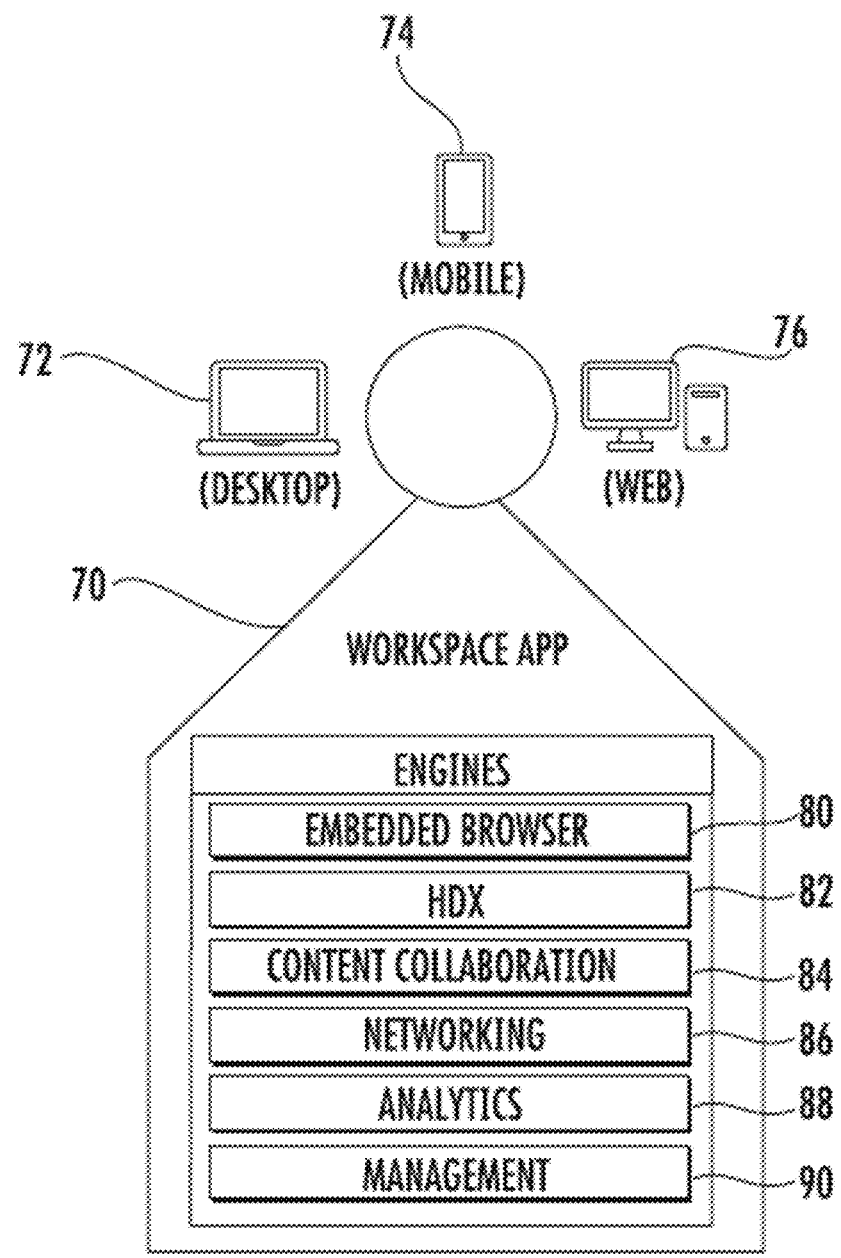
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
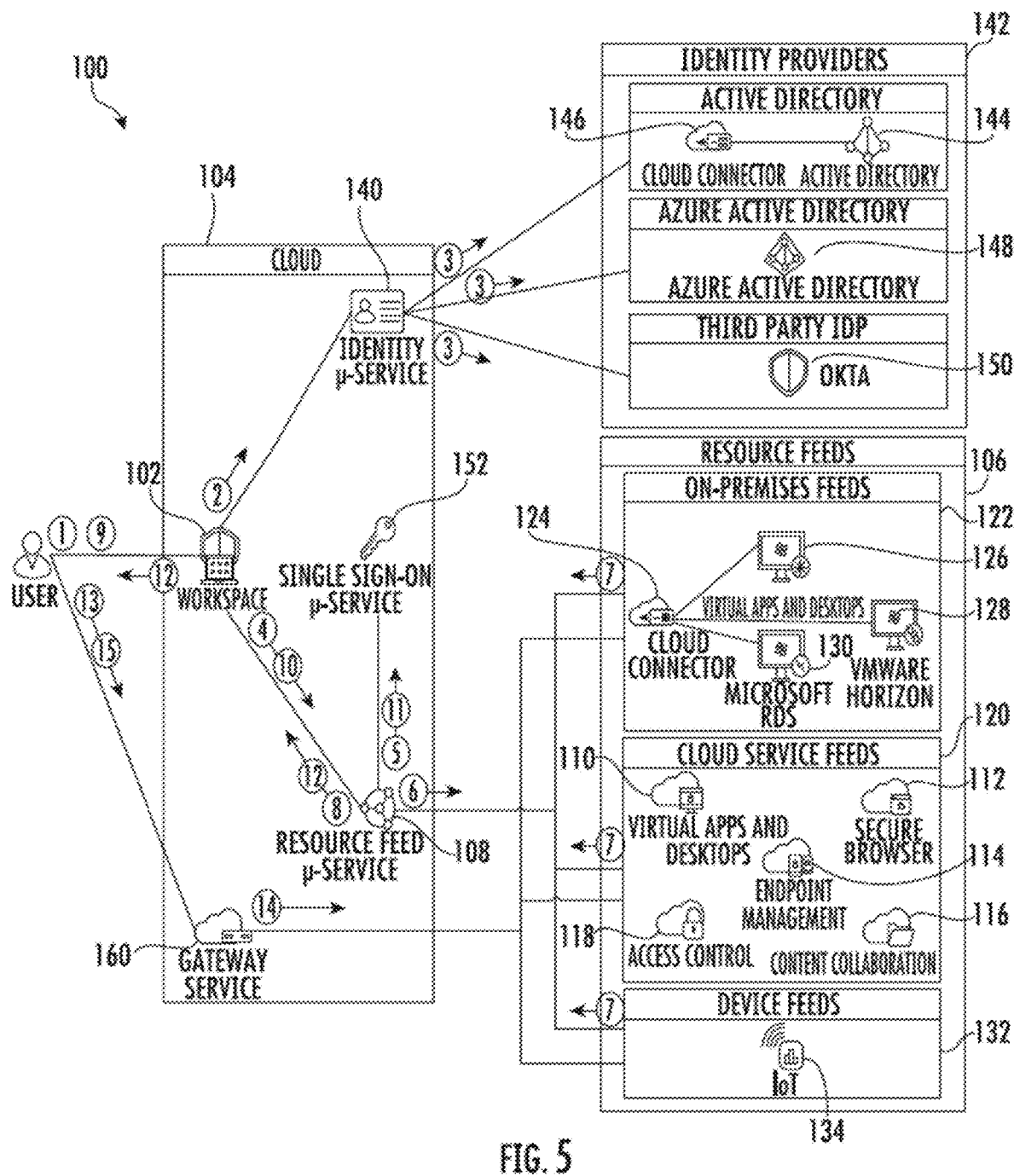
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a user name and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
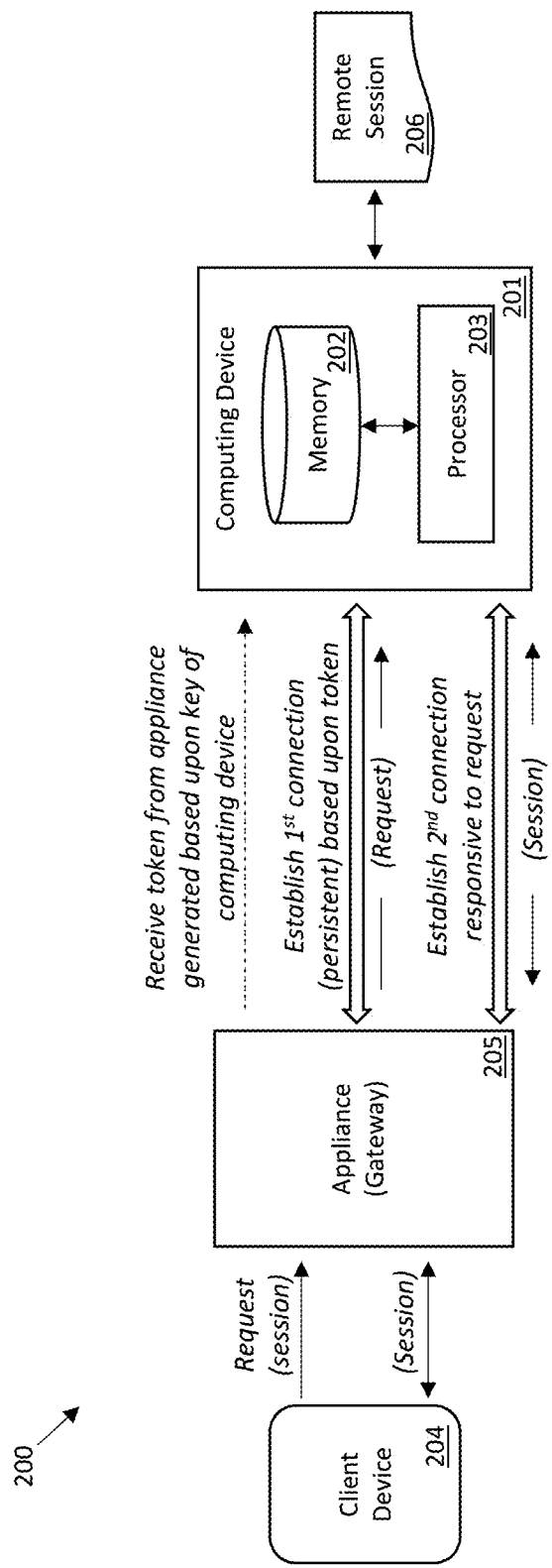
FIG. 6 is a schematic block diagram of a computing system providing session access to client devices based upon a multi-use token in an example embodiment.

Turning now to FIG. 6, a computing system 200 illustratively includes a computing device 201 including a memory 202 and a processor 203 configured to cooperate with the memory to perform various operations. The computing device may serve as a virtual delivery appliance, for example. The computing device 201 is configured to receive a token from an appliance 205 operating as a gateway (e.g., in a cloud gateway service center) between a client computing device 204 and the computing device 201. The token may be generated based upon a key of the computing device 201, as will also be discussed further below. The computing device 201 establishes a first connection with the appliance 205 based upon the token, with the first connection being persistent. The computing device 201 further receives a request from the appliance 205 via the first connection, the request being from the client device 204 for a remote session 206. Responsive to receipt of the request, the computing device 201 establishes a second connection with the appliance 205 that enables the client computing device to access the remote session 206.

An example architecture in which the system 200 may be implemented is now described with reference to a computing system 250 of FIG. 7. More particularly, the computing system 250 provides access to virtual sessions based upon connection leases. In the illustrated example, the connection lease generation functions are performed within a cloud computing service 255 (e.g., Citrix Cloud) which illustratively includes a cloud interface 256 configured to interface with a client device 252 for enrollment and lease generation to access virtual sessions 254. In an example embodiment, the cloud interface 256 may be implemented with Citrix Workspace (CWS), and the client device 252 may be running Citrix Workspace App (CWA), although other suitable platforms may be used in different embodiments. The cloud computing service 255 further illustratively includes a Root of Trust (RoT) 257, Connection Lease Issuing Service (CLIS) 258, gateway service 259, broker 260, and database 261, which will be described further below.

The client device 252 has a public-private encryption key pair associated therewith, which in the illustrated example is created by a hardware-backed key store 262. The hardware-backed key store 262 prevents the client device 252 operating system (OS) from accessing the private key. The client device 252 OS performs cryptographic operations with the private key, but without the ability to access/export the key. Examples of hardware-backed key stores include Trusted Platform Module (TPM) on a personal computer (PC), iOS Secure Enclave, and Android Hardware Key Store, for example, although other suitable encryption key generation platforms may also be used. By way of background, in some embodiments, a hardware-backed key store 262, such as a TPM, is a microchip installed on the motherboard of client device 252 and designed to provide basic security-related functions, e.g., primarily involving encryption keys. A hardware-backed key store 262 communicates with the remainder of the system by using a hardware bus. A client device 252 that incorporates a hardware-backed key store 262 can create cryptographic keys and encrypt them so that they can only be decrypted by the hardware-backed key store 262. This process, referred to as wrapping or binding a key, can help protect the key from disclosure, such as from other parts of the client device 252 (e.g., the client device operating system (OS) as described above), and therefore from potential exfiltration to malicious processes running on the client device or from exfiltration to other devices. A hardware-backed key store 262 could have a master wrapping key, called the storage root key, which is stored within the hardware-backed key store 262 itself. The private portion of a storage root key or endorsement key that is created in a hardware-backed key store 262 is never exposed to any other component, software, process, or user. Because a hardware-backed key store 262 uses its own internal firmware and logic circuits to process instructions, it does not rely on the operating system, and it is not exposed to vulnerabilities that might exist in the operating system or application software.

Turning back to FIG. 7, the client device 252 provides its public key to the cloud interface 256 (step (1) in FIG. 7), which then has the public key signed by the RoT 257 (step (2) in FIG. 7) and returns the signed public key to the client device (step (3) in FIG. 7). Having the public key signed by the RoT 257 is significant because the gateway 263, the virtual delivery appliance 253, and the broker 260 also trust the RoT and can therefore use its signature to authenticate the client device public key.

Figure 7:
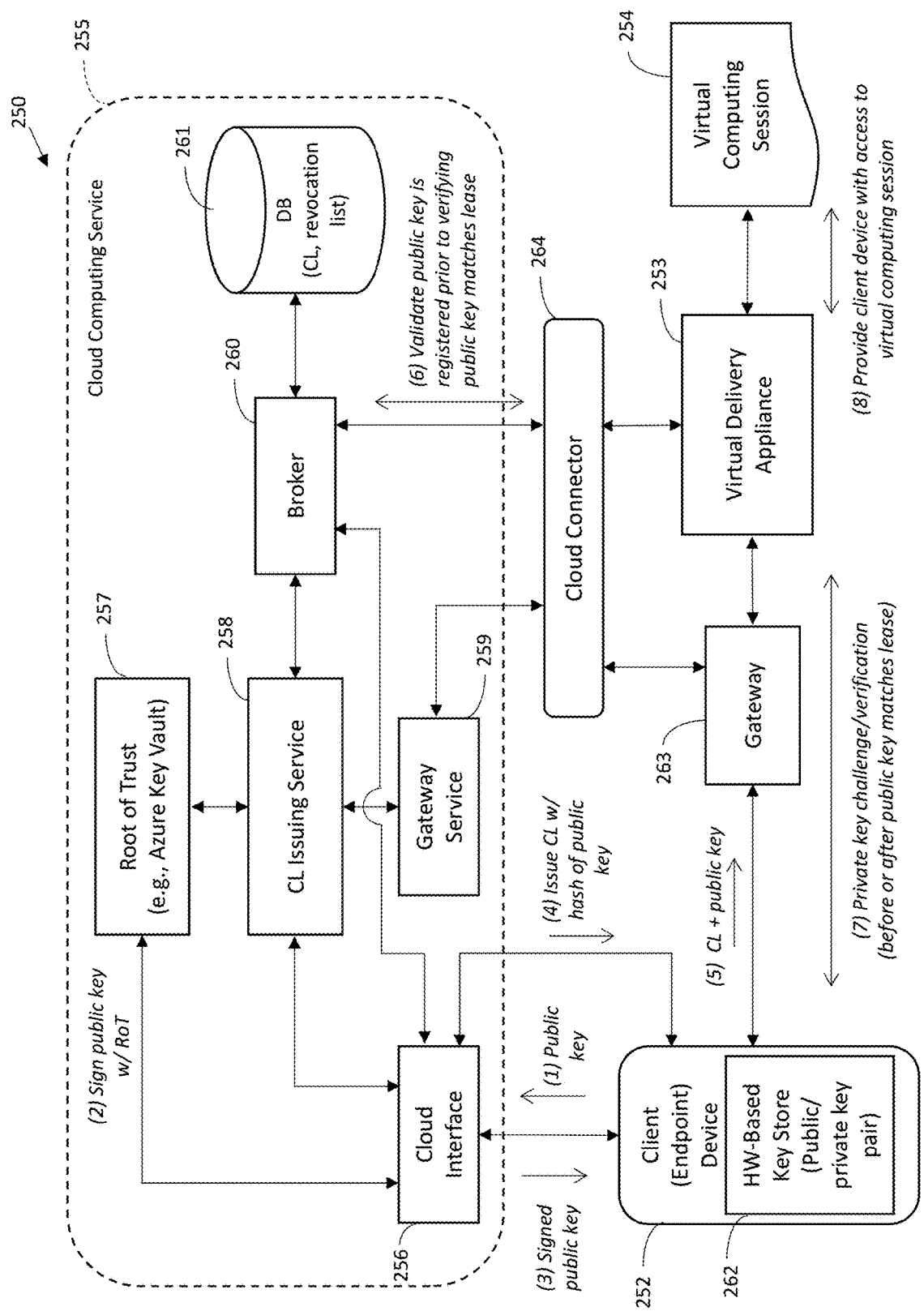
FIG. 7 is a schematic block diagram of a connection lease architecture and independent flow sequences in which the system of FIG. 6 may be implemented in accordance with an example embodiment.

The client device 252 may then communicate with the CLIS 258 via the cloud interface 256 to obtain the connection lease (step (4) in FIG. 7). The client device 252 public key may be provided to a host or virtual delivery appliance 253 (e.g., Citrix VDA) either indirectly via the broker 260 or directly by the client device. In the present example, the virtual delivery appliance 253 is enabled for use with connection leases. In other embodiments, legacy virtual delivery appliances may be used that do not directly support connection leases but instead implement connection leases validated by an agent, e.g. Cloud Connector 264. Therefore, in these embodiments with virtual delivery appliances that do not directly support connection leases, a Cloud Connector 264 is still required. However, the use of the Cloud Connector 264 may be limited to only the initial connection lease validation and does not have to involve the subsequent connection to the virtual delivery appliance, which may still be done without the use of an agent as previously described. If the client device 252 public key is indirectly provided to the virtual delivery appliance 253, then the security associated with the client-to-broker communications and virtual delivery appliance-to-broker communications may be leveraged for secure client public key transmission. However, this may involve a relatively large number of client public keys (from multiple different client devices 252) being communicated indirectly to the virtual delivery appliance 253.

On the other hand, the client device 252 public key could be directly provided by the client device to the virtual delivery appliance 253, which in the present case is done via the gateway 263 (step (5) in FIG. 7). Both the client device 252 and the virtual delivery appliance 253 trust the RoT 257. Since the virtual delivery appliance 253 trusts the RoT 257 and has access to the RoT public key, the virtual delivery appliance 253 is able to verify the validity of the client device 252 based on the RoT signature on the public key and, if valid, may then trust the client device public key. In yet another embodiment, the client device public key may also optionally be signed by the broker 260 beforehand. Both the client device 252 and the virtual delivery appliance 253 trust the broker 260. Since the virtual delivery appliance 253 trusts the broker 260 and has access to the broker public key, the virtual delivery appliance 253 is able to verify the validity of the client device 252 based on the broker signature on the public key and, if valid, may then trust the client device public key. In the illustrated example, the signed public key of the client device 252 is provided directly to the virtual delivery appliance 253 along with the connection lease via a gateway 263. In an example implementation, the gateway 263 may be implemented using Citrix Gateway, for example, although other suitable platforms may also be used in different embodiments.

The virtual delivery appliance 253 and gateway 263 may communicate with the broker 260 and gateway service 259 (which may be implemented using Citrix Secure Web Gateway, for example) via a cloud connector 264. In an example embodiment, the cloud connector 264 may be implemented with Citrix Cloud Connector, although other suitable platforms may also be used in different embodiments. Citrix Cloud Connector is a component that serves as a channel for communication between Citrix Cloud and customer resource locations, enabling cloud management without requiring complex networking or infrastructure configuration. However, other suitable cloud connection infrastructure may also be used in different embodiments.

The client device 252 signed public key or a hash of the client device signed public key (thumbprint) is included in the connection lease generated by the CLIS 258 and is one of the fields of the connection lease that are included when computing the signature of the connection lease. The signature of the connection lease helps ensure that the connection lease contents are valid and have not been tampered with. As a result, a connection lease is created for the specific client device 252, not just a specific authenticated user.

Furthermore, the virtual delivery appliance 253 may use a challenge-response to validate that the client device 252 is the true owner of the corresponding private key. First, the virtual delivery appliance 253 validates that the client device 252 public key is valid, and more particularly signed by the RoT 257 and/or broker 260 (step (6) in FIG. 7). In the illustrated example, the client device 252 public key was sent directly by the client device to the virtual delivery appliance 253, as noted above. In some embodiments, connection lease revocation may be applied when a client device 252 or virtual delivery appliance 253 is offline with respect to the CLIS 258 or broker 260. Being online is not a requirement for use of a connection lease since connection leases may be used in an offline mode. Connection lease and revocation list details may be stored in the database 261 for comparison by the broker 260 with the information provided by the virtual delivery appliance 253.

Second, upon early session establishment, e.g. after transport and presentation-level protocol establishment, between the client device 252 and virtual delivery appliance 253, the virtual delivery appliance 253 challenges the client device 252 to sign a nonce (an arbitrary number used once in a cryptographic communication) with its private key (step (7) in FIG. 7). The virtual delivery appliance 253 verifies the signature of the nonce with the client device 252 public key. This allows the virtual delivery appliance 253 to know that the client device 252 is in fact the owner of the corresponding private key. It should be noted that this step could be performed prior to validating the public key of the client device 252 with the RoT 257 and/or broker 260 in some embodiments, if desired.

Furthermore, the virtual delivery appliance 253 validates that the connection lease includes the public key (or hash of public key) matching the client device 252 public key. More particularly, the virtual delivery appliance 253 first validates the connection lease signature and date, making sure that the broker 260 signature on the lease is valid (using the RoT 257 signed broker public key, since the virtual delivery appliance trusts the RoT) and that the lease has not expired. Moreover, the virtual delivery appliance 253 may verify that the connection lease includes the client device 252 public key, or a hash of the client device public key, in which case the virtual delivery appliance computes the hash of the client device public key. If the connection lease includes the matching client device 252 public key, then the virtual delivery appliance 253 confirms that the connection lease was sent from the client device for which it was created.

As a result, if a connection lease is stolen from the client device 252 and used from a malicious client device, the session establishment between the malicious client and the virtual delivery appliance 253 will not succeed because the malicious client device will not have access to the client private key, this key being non-exportable and stored in the hardware-backed key store 262.

The illustrated connection lease management infrastructure also advantageously allows for connection lease validation using a "reverse prepare for session" operation from the virtual delivery appliance 253 (e.g., a Citrix VDA, etc.), as a target resource location, to the Broker 260 (e.g., Citrix Virtual Apps and Desktops Broker). This may be done in conjunction with the connection lease exchange that occurs between the client device 252 and the virtual delivery appliance 253, and utilizing signed responses from the broker 260 and virtual delivery appliance 253. These play a significant role for the resiliency, security, performance and user experience (UX) with respect to connection leasing.

Figure 8:
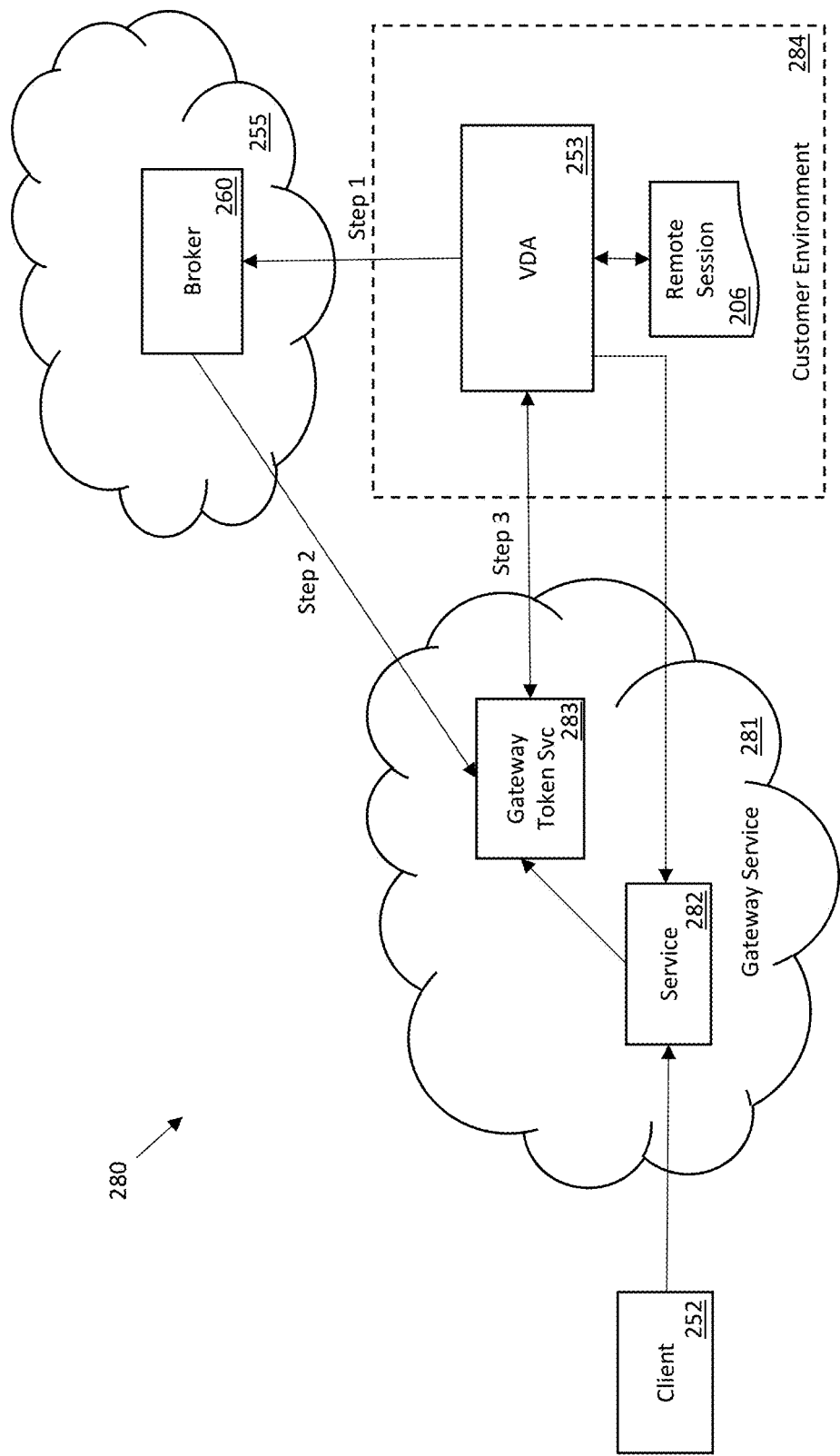
FIG. 8 is a schematic block diagram of an example implementation of the system of FIG. 6 within the connection lease architecture of FIG. 7.
Figure 9:
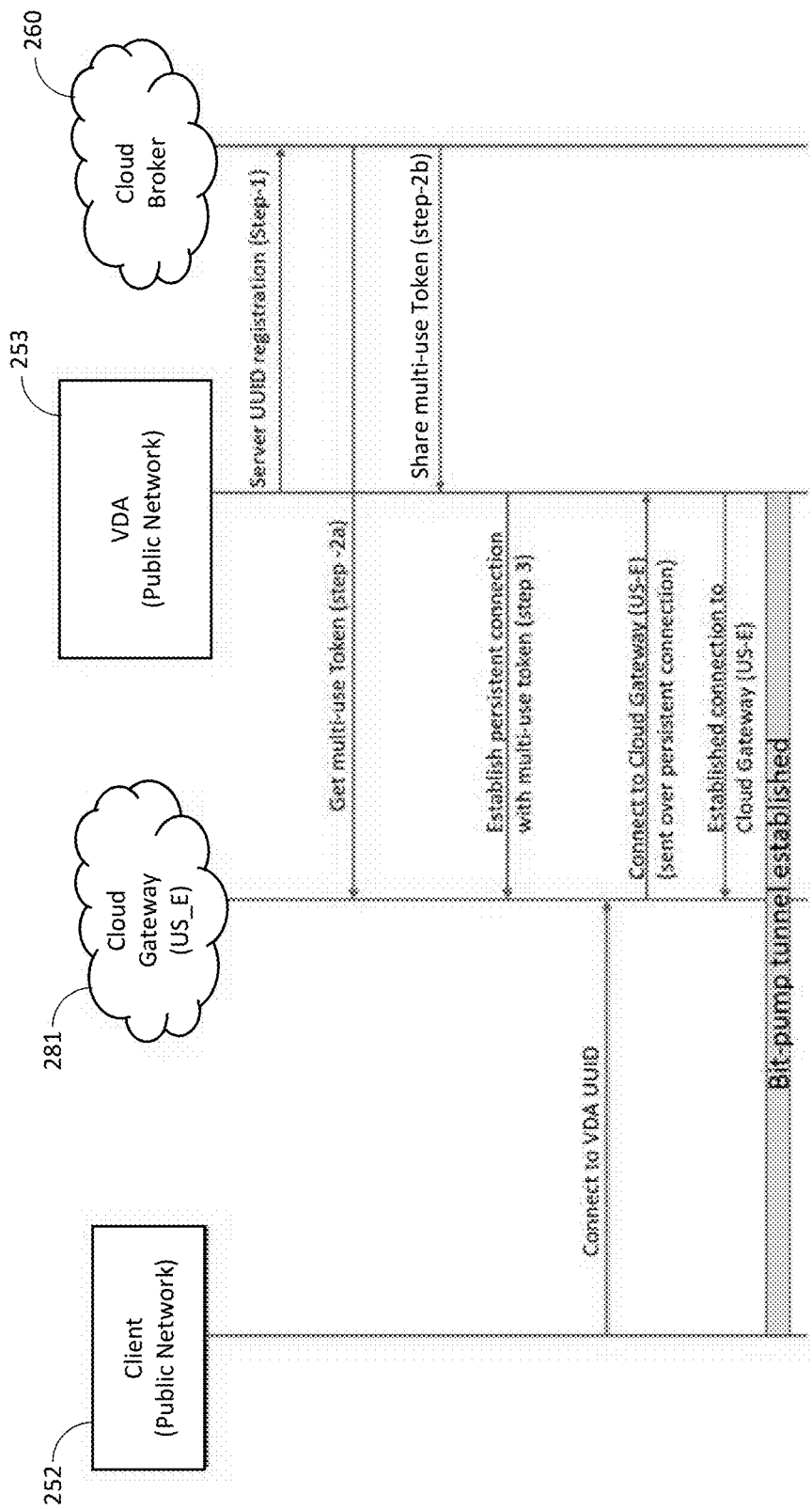
FIG. 9 is a sequence diagram illustrating operation of the system of FIG. 8 in an example embodiment.

Turning now to FIGS. 8 and 9, an example computing system 280 is described which is an implementation of the system 200 of FIG. 6 using the connection lease infrastructure set forth in FIG. 7. In the illustrated example, the gateway 263 of FIG. 7 is implemented as a cloud gateway service 281 including one or more service modules 282 and token service modules 283. The gateway service 281 may include a plurality of instances in different regions, such as in Global Server Load Balancing (GSLB) regions, and in the example of FIG. 9 the US-East region instance of the gateway service 281 is in communication with the client 252 and VDA 253 via public networks. Furthermore, one or more virtual delivery appliances (VDAs) 253 are located at a customer premises or environment 284 (e.g., data center), and therefore serves as a backend VDA for the client 252 to access remote sessions within the customer environment, as discussed further above. The illustrated configuration removes the need for an agent (e.g., the cloud connector 264 in FIG. 7) in the customer environment 284 for the purpose of providing access to the VDA 253 (although the agent may still be used at the customer environment for other purposes in some embodiments). Instead, VDA 253 in the customer environment 284 establishes and maintains a connection (e.g., a persistent control connection) with the cloud gateway service 281 directly, as will be discussed further below. In an example implementation, the gateway service 281 may be provided by Citrix Gateway Service, the VDA 253 may be implemented using Citrix VDA, although other suitable platforms may be used in different implementations.

The backend VDA 253 may include an additional library/plugin incorporating functionality which would otherwise reside with an on-premises agent so that it may directly establish its own connection (e.g., a persistent control connection) with the gateway service 281. The gateway service 281 should trust the VDA 253 before accepting the connection. The client 252, gateway service 281, and VDA 253 are independently in a trust agreement/relationship with the broker 260, which helps to facilitate establishment of the connection between the VDA and gateway service, and for the client to choose/connect to the backend VDA.

The connection process between the gateway service 281 and the VDA 253 includes three overall steps. In the first step, the VDA 253 establishes a connection and trust with the broker 260 as discussed above, and obtains a unique identifier (UUID) generated by the broker 260. In the second step, the broker 260 requests that the gateway service 281 generate a token (e.g., a multi-use token), and the broker shares the token with the VDA 253. In the third step, the VDA 253 establishes a connection (e.g., a persistent control connection) with the gateway service 281 using the multi-use token and UUID. These steps will be described in further detail below.

After the connection is established, the VDA 253 waits for a connection request from the client 252, over which a remote computing session or access to a resource is provided to the client. By way of example, the client 252 may request a connection to the gateway service 281 with the UUID of the VDA 253 over a bit-pump tunnel. The gateway service 281 sends the connection request through the connection of the specific VDA 253 which owns the UUID. Upon receiving the client connection request, the VDA 253 connects to the gateway service 281, where the client 252 is waiting for the data connection. At this point the connection (e.g., a communications tunnel) is established between the client 252, cloud service module 282 and VDA 253 in the customer environment 284 without use of an agent or connector devices.

In an example embodiment, the multi-use token may have a few days of validity. It can be used multiple times to connect until its expiration. The token is signed during creation by the gateway token service module 283, and the signature may be verified by a token consumer, as will be discussed further below. The consumer ensures the authenticity and integrity of the token by verifying the signature before consumption.

For example, in the third step, when the gateway service 281 is consuming the token presented by the VDA 253, it verifies authenticity and integrity of the token. The token is signed by a private key of the gateway service 281 during token generation. To verify the signature, the public key corresponding to the gateway service 281 private key (key pair) which signed the token is used. To verify the signature, the public key is included (e.g., embedded) within the token itself. So, there is no need to explicitly maintain the public key. The public key is signed by a key authority (e.g., the RoT 257). The consumer verifies the public key signature using the key authority public key before using the validated public key to verify the token. This approach advantageously allows different gateway service 281 at Points of Presence (POPs) to issue and validate the token, e.g., in failover scenarios, without the need to explicitly share keys.

The key pair of the gateway service 281 may be expired and rotated on regular intervals for increased security. In an example implementation, the gateway service 281 is a multi-region, multi-server computing environment, in which receipt of the token can possibly occur on any region and any server. It can accordingly be challenging to synchronize the key pairs across regions and server computing environments. While it is possible to synchronize these keys across the different regions, the keys may be rotated on a short enough interval that could potentially cause the loss of the public key (due to rotation) which is needed to verify the signature of a multi-use token. To overcome this technical problem, the public key may be included with the token as well.

If a Service A wants to exchange/share its public key with another Service B, Service A can request the key authority service to sign the public key over a secure connection. The key authority service can sign Service A's public key using its private key. Later, a Service B can verify the signature of Service A's exchanged/received public key using the key authority service's public key. Service B can fetch the key authority service's public key over a secure connection.

Figure 10:
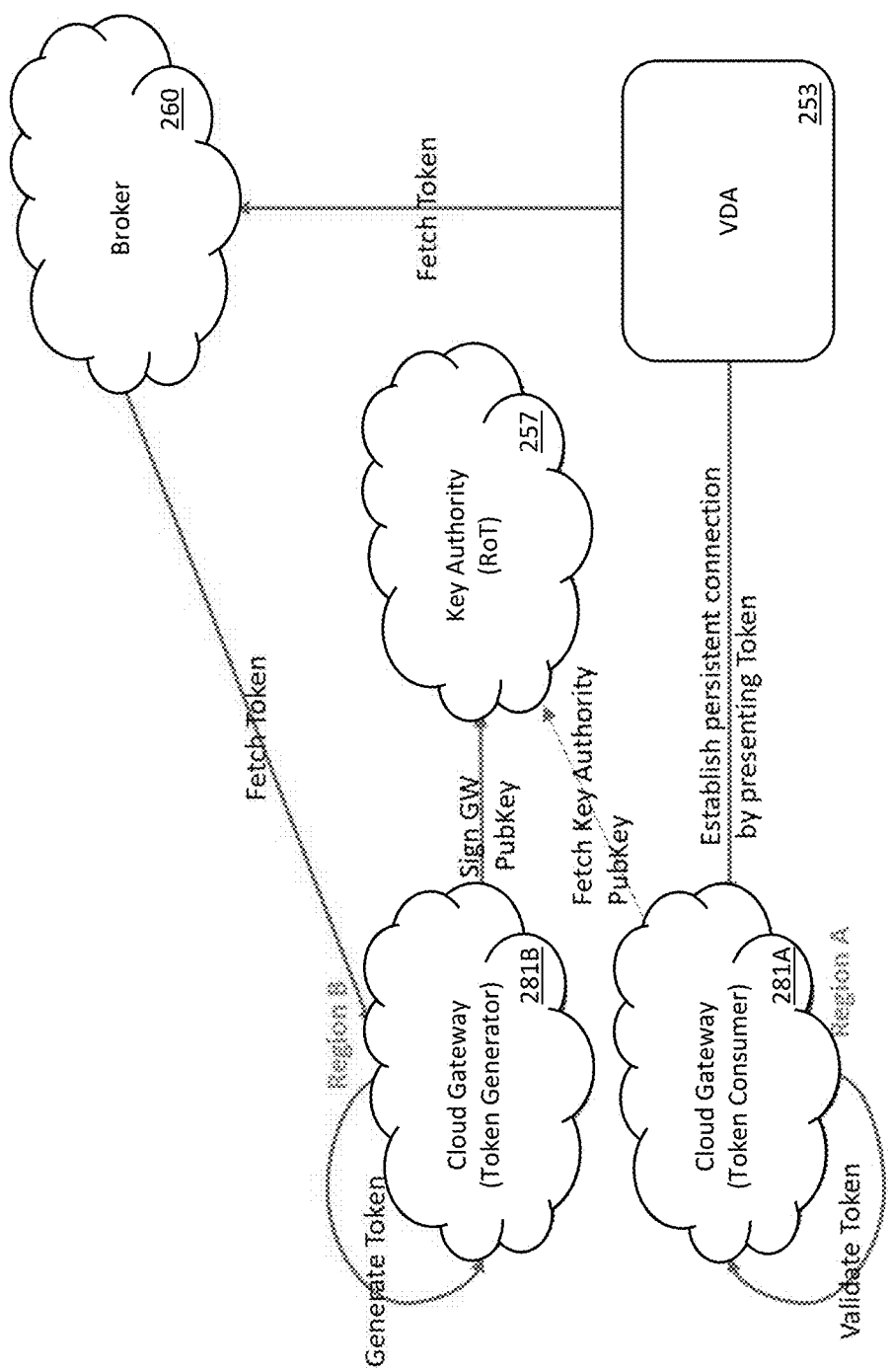
FIG. 10 is a schematic block diagram further illustrating steps 2 and 3 shown in FIG. 8.

Referring additionally to FIG. 10, in an example embodiment, the key authority service 257 has two APIs: (1) an API to sign a public key presented by an authorized Service; and (2) an API to share the key authority public key to an authorized service. The gateway service 281B in Region B which generates the token gets its public key signed by the key authority service 257 using the first API, which it attaches with the token. The gateway service 281A in Region A which consumes the token fetches the key authority public key using the second API, and then verifies the public key attached with the token using the key authority public key.

Any regional gateway service 281 instance can accept the token, because all regional gateway service instances fetch the key authority 257 public keys and store them. This provides an additional benefit of resiliency for the VDA 253 to establish connections (e.g., a persistent connection) to other regions in case one region is down.

The token may be generated by the gateway service 281 as follows. Token data is populated with the VDA 253 public key thumbprint to ensure anti-theft protection, which is explained further below. The thumbprint can be a hash of the VDA 253 public key, for example. The token data is then signed with the gateway service 281 private key, and the gateway service public key is signed by sending it to the key authority 257 via API. The token is generated with the token data, signature of the token data, gateway service 281 public key, and the signature of gateway service public key.

Figure 11:
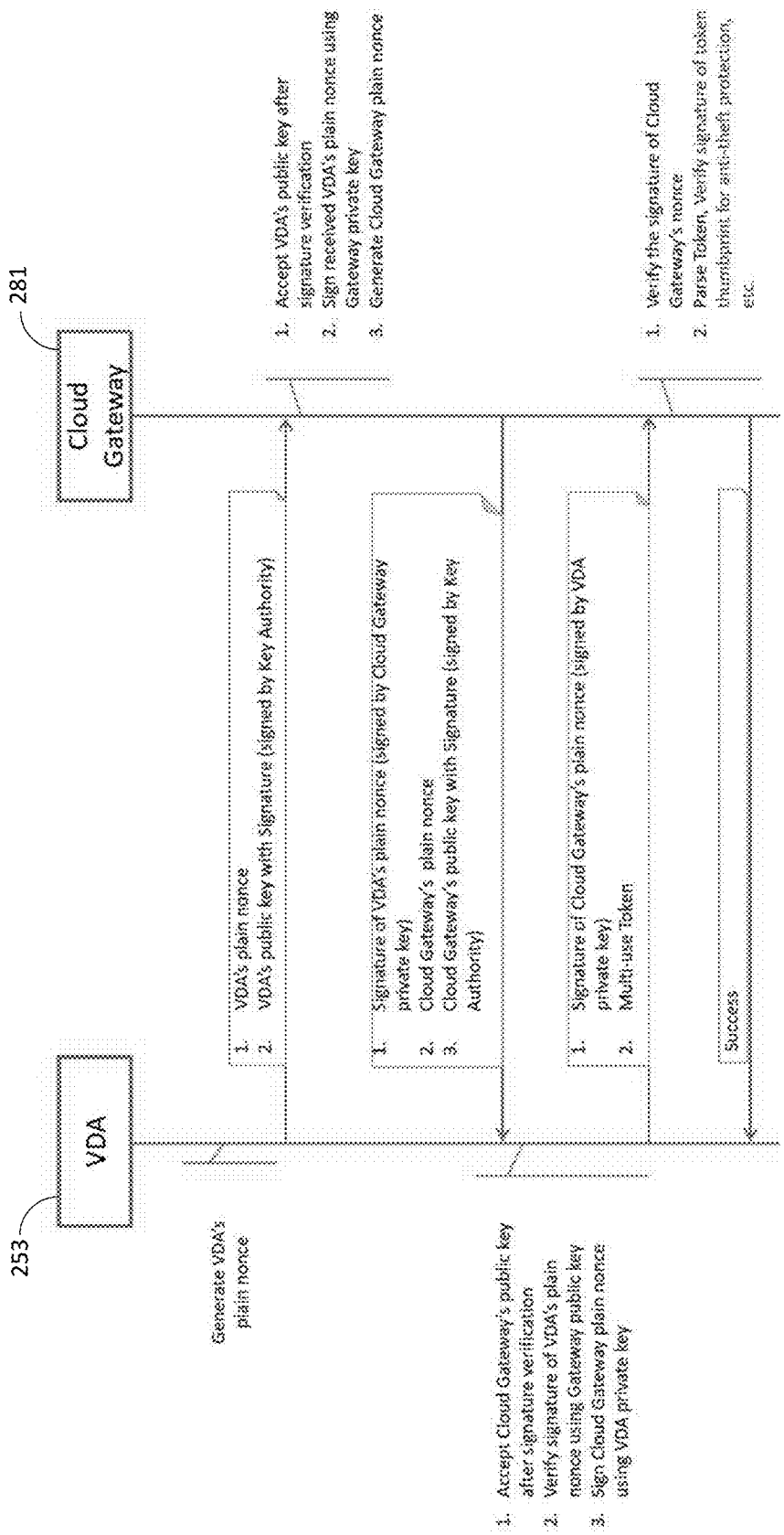
FIG. 11 is a sequence diagram illustrating an example approach to establishment of a persistent connection using a token with a challenge-response in the system of FIG. 8.

Referring additionally to FIG. 11, the token is accepted by the gateway service 281 after the VDA 253 performs a challenge response with the gateway service 281 using keys and nonce before presenting the token. The challenge-response sequence is as follows. The VDA 253 generates its plain nonce and sends its public key along with the key authority 257 signature to the gateway service 281. The gateway service 281 verifies the key authority 257 signature of the VDA 253 public key. The gateway service 281 generates its plain nonce, signs the received VDA's plain nonce using the gateway service private key. The gateway service 281 then responds to VDA 253 with the gateway service 281 public key with key authority 257 signature, the gateway service plain nonce, and the signature of the received VDA's plain nonce (signed by gateway service 281 private key). The VDA 253 verifies the key authority 257 signature of the gateway service 281 public key, verifies the signature of VDA's nonce using the validated gateway service 281 public key, and signs the gateway service nonce using the VDA private key. It then sends the signed gateway service 281 nonce and multi-use token to the gateway service.

The gateway service 281 verifies the signature of the gateway service nonce using the received VDA public key. After these challenge-responses are successful, the gateway service 281 will then proceed to token parsing, in which the signature of the gateway service public key shared along in the token is verified using the key authority 257 service public key. The signature of the token data is then verified using the gateway service 281 public key (which has been verified in a previous step), and the VDA 253 public key thumbprint is verified before using the token data. The thumbprint is verified by computing a hash of the VDA 253 public key, which was used in the challenge-response sequence, and ensuring that the computed hash matches the VDA public key thumbprint (hash) in the token. This helps to ensure that the token has not been exfiltrated and used from another otherwise valid VDA 253, which is able to answer a challenge-response.

Figure 12:
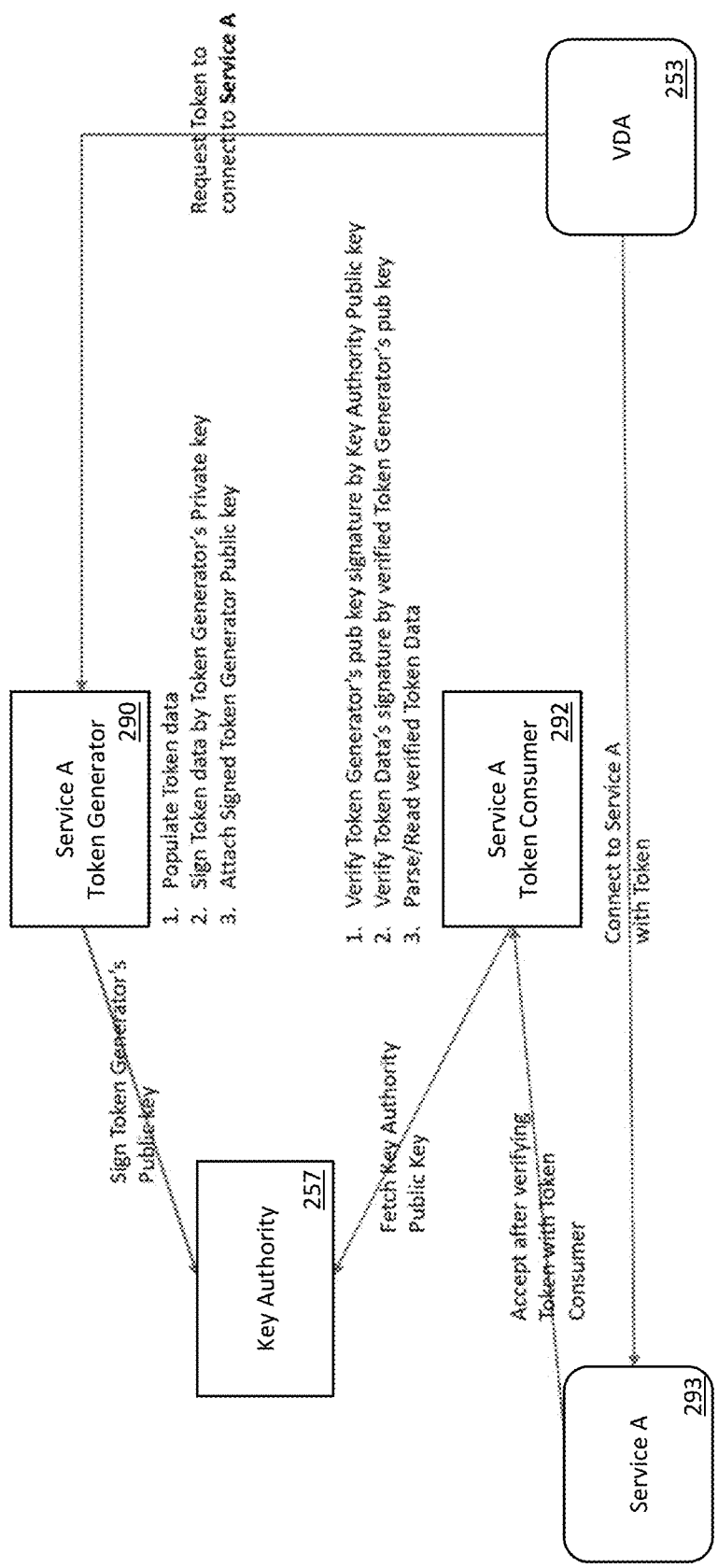
FIG. 12 is a schematic block diagram of an example multi-use token flow which may be used by the system of FIG. 8.

Referring additionally to FIG. 12, in an example implementation a token generator 290 (Service A Token Generator), generates the token responsive to a request from a VDA 253 with its key pairs (TG_PrivKey, TG_PubKey). More particularly, the token generator 290 populates the token data, signs the token data using its private key (TG_PrivKey), and attaches the signed token generator public key, which is signed by the key authority 257 private key. A token consumer 292 (Service A Token Consumer) fetches the key authority 257 public key from the key authority, verifies the public key signature of the token generator 290 with the key authority 257 public key, verifies the token data signature with the verified token generator public key, and parses/reads the verified token data and connects to a service module 293 (Service A) after authorizing the token. The key authority 257 allows the token consumer 292 to be able to trust the token generator 290 public key for token verification.

An example format for the multi-use token is as follows:

Multi-use Token=TOKEN_DATA+(TOKEN DATA)
Signed by TG_PrivKey+TG_PubKey+
TG_PubKey)Signed by KA_PrivKey where: TOKEN_DATA includes non-sensitive data to be authorized; (TOKEN_DATA)Signed by TG_PrivKey is the signature of TOKEN_DATA; TG_PrivKey is the token generator owned private key of its key pair; TG_PubKey is the token generator owned public key of its key pair; (TG_PubKey)Signed by KA_PrivKey is the signature of TG_PubKey; and KA_PrivKey is the private key of key authority service.

In the persistent connection establishment, the gateway service 290 is the token generator, which owns the TG_PrivKey, TG_PubKey pair. The TOKEN_DATA is populated and signed by the gateway service 290 private key (TG_PrivKey). The gateway service 290 requests the key authority (RoT) 257 to sign the TG_PubKey. The key authority 257 signs TG_PubKey using KA_PrivKey. Further, the gateway service 290 generates the multi-use token with TOKEN_DATA, the signature of TOKEN_DATA using TG_PrivKey, TG_PubKey, and the signature of TG_Pubkey using KA_PrivKey. The gateway service 290 is the token consumer as well, although it may be from a different regional instance of the gateway service 281 as will be discussed further below. The VDA 253 presents to the gateway service 293 the multi-use token for establishing persistent connection to the gateway service. The consumer of the multi-use token may regularly fetch KA_PubKey from the key authority 257 service. Upon receiving the multi-use token, the consumer retrieves TG_Pubkey after verifying the signature of TG_PubKey using KA_PubKey, and retrieves/reads TOKEN_DATA after verifying the signature of TOKEN_DATA using TG_Pubkey.

Figure 13:
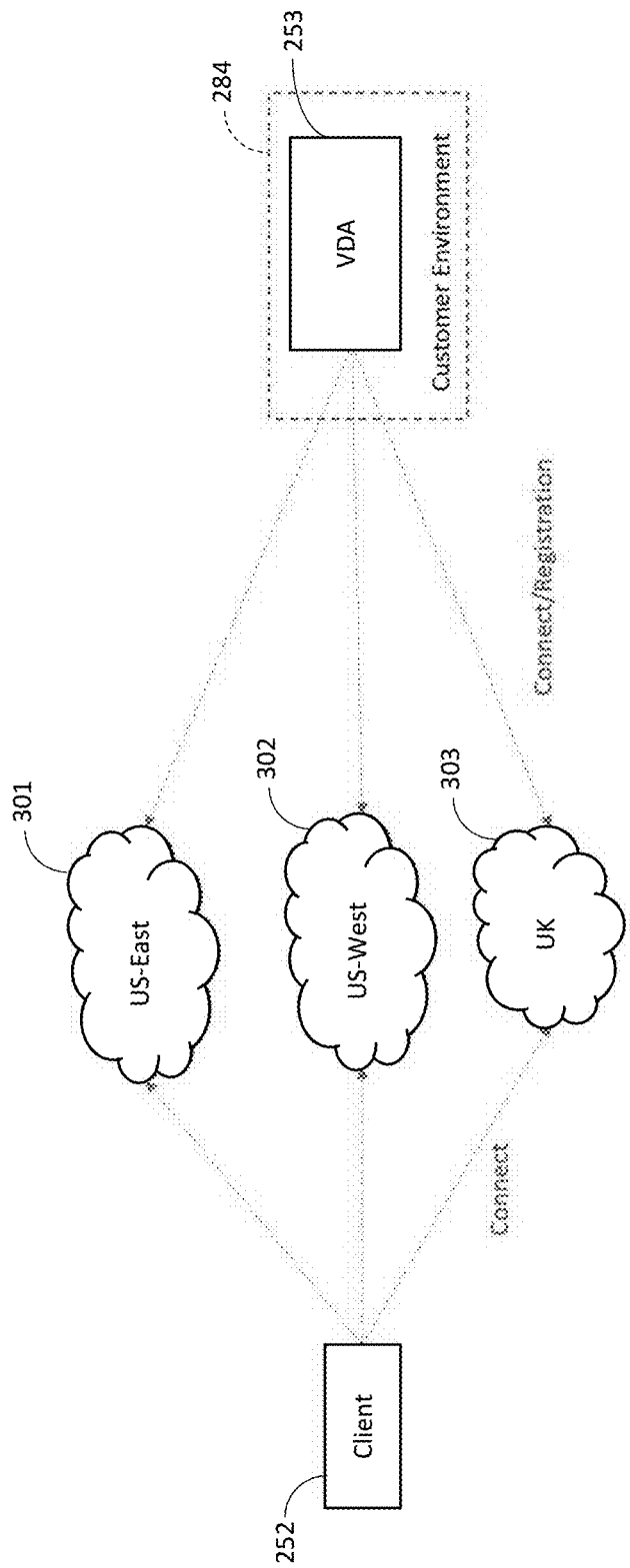
FIG. 13 is a schematic block diagram of an example implementation of the system of FIG. 8 with a multi-region cloud gateway service chosen based on client/VDA location proximity.

As noted above, gateway service 281 may be geographically distributed across multiple GSLB instances. In such configurations, the VDA 253 will typically choose the nearest gateway service 281 region using GSLB/DNS resolution based on proximity. If the nearest gateway service 281 service is down, the VDA 253 can still establish a connection (e.g., a persistent control connection) to the next nearest region with the same token. In the example illustrated in FIG. 13, this may be any of a US-East, US-West, and UK regional instances 301, 302, 303 of the gateway service 281. Similarly, the client 252 also chooses the nearest gateway service 281 region using GSLB/DNS resolution based on proximity. If the nearest gateway service 281 service is down, the client 252 can still establish a communications link (e.g., a bit-pump tunnel) with the next nearest region, which in this example may be any of the US-East, US-West, and UK regional instances 301, 302, 303.

Figure 14:
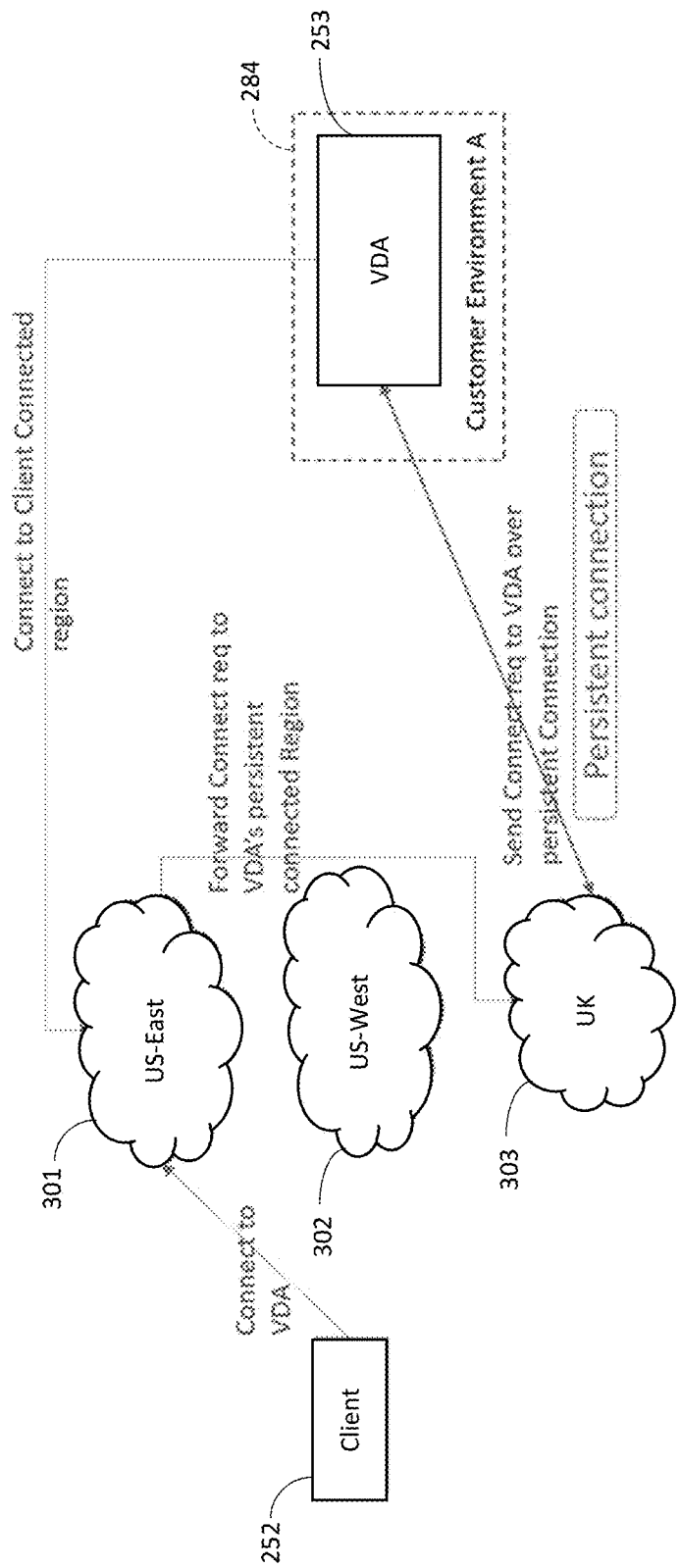
FIG. 14 is a schematic block diagram of an example implementation of the system of FIG. 8 in which environments are connected to two different regions.

Turning to FIG. 14, an example is provided where the VDA 253 is located in a UK customer data center 284 and has a connection (e.g., a persistent connection) to the UK region gateway service instance 303. The client 252 is located in the US-EAST region and requests a communication link (e.g., a bit-pump connection) to the US-EAST region gateway service instance 301 which is geographically nearest to itself. The US-EAST gateway service instance 301 relays the request to the UK gateway service instance 303. The UK gateway service instance 303 sends the connection request via the existing connection to the VDA 253, along with information indicating where the client 252 is connected (in the current example it is the US-EAST region). The VDA 253 establishes a connection to the US-EAST gateway service instance 301, in which the client connection is waiting. A communications link is established between the US-EAST region client 252 and the VDA 253 in the UK customer environment 284. In this way, the VDA 253 and client 252 can be connected to the client's nearest gateway service instance in different geographical regions.

Various optional techniques may be used to optimize the overall communications link in some embodiments. For example, the VDA 253 in the customer environment 284 can be instructed, upon preparing for session (e.g., HDX Session) to establish a connection to a region where the client 252 will most likely establish a communications link (e.g., to connect for bit-pump connection establishment). For example, the VDA 253 can prepare a connection to "Region A" gateway service instance before or in parallel to the client connecting to the "Region A" gateway service instance. This involves determining the gateway service instance that the client 252 will be most likely to connect to ahead of time. For example, NLS (Network Location Service) would already know the location (based on public IP address) of the client 252 at the time the launch is initiated (in pre-launch stage) with Workspace/Store Service. As such, a resolution can be made to the nearest gateway service POP region, which is communicated to the VDA 253. For robustness, in the case where the client 252 happens to connect to a different gateway service POP region, a fallback can be executed to instruct the VDA 253, via the connection (e.g., a persistent control connection), to connect to the correct POP. Another example optimization is that the VDA 253 can start a session (e.g., an HDX session) in parallel and begin to log the user in, start an initial application(s), etc.

Figure 15:
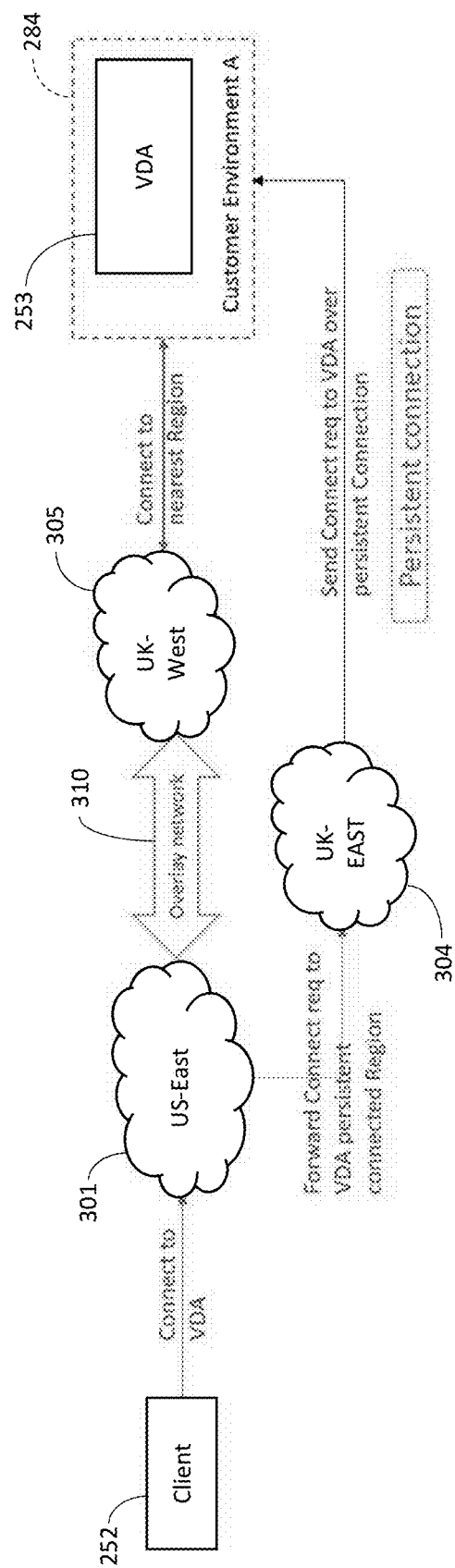
FIG. 15 is a schematic block diagram of an example implementation of the system of FIG. 8 utilizing an overlay network to connect the client and customer environments.

Turning now to FIG. 15, a potential problem with bit-pump connections is that in cases where the client 252 is connected to a remote region (e.g., US-EAST) with respect to the customer environment data center 284 home location (e.g., UK-WEST), the VDA 253 (UK-WEST) should connect to the remote region POP (US-EAST) where the client is connected. For example, consider the VDA 253 which is nearest to the UK-WEST gateway service instance 305. The VDA 253 will possibly connect to the US-EAST gateway service instance 301 when the client 252 is connected in the US-EAST region, which potentially introduces latency because of the POP connections across multiple countries.

To help overcome this latency, in the present example the client 252 can connect to its nearest regional POP for the US-EAST gateway service instance 301, and the VDA 253 can connect to its nearest regional POP for the UK-WEST gateway service instance 305 to establish a session using a communications link (e.g., a bit-pump connection). Then both POPs (client-connected, and VDA-connected) can establish a network 310 (e.g., an overlay network on top of another network, in which nodes are connected by logical or virtual links that correspond to a path in the underlying network) between the POPs to improve performance. The network 310 can be from cloud provider region to region. For example, the US-EAST gateway service instance 301 and UK-WEST gateway service instance 305 can establish the overlay network when the client 252 is connected to the US-EAST region and the VDA 253 is connected to the UK-WEST region. The VDA 253 sends traffic to the UK-WEST gateway service instance 305, and the UK-WEST gateway service instance sends traffic through the overlay network with the US-EAST gateway service instance 301 to which the client 252 is connected. Note that the connection (e.g., a persistent (control) connection) in this example is between the VDA 253 and the UK-EAST gateway service instance 304. That is, the different connections between the VDA 253 and gateway service 281 can be through different regions in some embodiments.

For backward compatibility for the customer environment data center 284 where an agent is otherwise present for performing different tasks, a fallback approach may also be supported by the gateway service 281. More particularly, the gateway service 281 first attempts agentless connection establishment. If the gateway service 281 is not able to obtain a connection from the VDA 253 within a period of time (e.g., a configured timeout period), the gateway service can be configured to fall back and attempt an agent-based connection request as discussed above, and proceed if this connection is successful.

Enlightened Data Transport Protocol (EDT) is a reliable data transfer over User Datagram Protocol (UDP). EDT supports both reliable and lossy traffic over the same transport, e.g., the same physical socket but with different logical sockets. The connection (e.g., a bit-pump connection) can be established with EDT based on a connection over Datagram Transport Layer Security (DTLS) in cases where all of the VDA 253, client 252, and gateway service 281 support DTLS handshakes. The EDT/DTLS/UDP based connection can provide faster transfer of streams between the client 252 and VDA 253 over a wide area network (WAN). EDT improves both throughput and session interactivity in challenging network conditions of latency and/or packet loss. The VDA 253, client 252, and gateway service 281 can fallback to Transmission Control Protocol (TCP)-based connections over TLS where there is a DTLS handshake failure due to firewall blocking, intermittent network failures, etc.

To support EDT-based bit-pump connections, the customer environment 284 may open itself to DTLS handshakes from the backend VDA 253. However, in the event that DTLS is denied/blocked by firewall/proxy, the connection establishment may otherwise fail. To overcome such failures, a fallback approach may be supported by the client 252 and gateway service 281. The client 252 supports fallback by attempting both TLS and DTLS handshakes in parallel. The first one that succeeds proceeds forward. The DTLS handshake may complete first/fastest if DTLS is allowed and supported by the client 252, gateway service 281, the backend VDA 253, and the customer environment 284. Since EDT is the preferred connection approach in this example, and since DTLS uses a four-way handshake, it may be given a head start (e.g., 0.5 seconds) ahead of the TLS attempt. If the DTLS handshake takes time or fails, but TLS succeeds, the client proceeds with the TLS connection.

If before attempting a DTLS handshake with the VDA 253 the gateway service 281 finds any prerequisite failure, it responds to the client 252 to fallback to TLS (TCP). The client 252 winds down the already established DTLS connection to the gateway service 281 and proceeds with TLS. If there is no pre-requisite failure, but the backend VDA 253 has issues in the DTLS handshake, the gateway service 281 times out and responds by falling back using the same mechanism—the gateway service responds to the client 252 to fallback to TLS(TCP), and the client proceeds with TLS. In some embodiments, if a problem occurs with the connection between the client 252 and gateway service 281 or the gateway service and the backend VDA 253, the gateway service may attempt to re-establish that connection using the primary protocol (e.g., EDT) while maintaining the other connection for a time before reverting back to a secondary (e.g., TCP) protocol for the bit-pump tunnel.

As noted above, the gateway service 281 may support resiliency by fallback to different agents (e.g., connectors 264) in/across the customer environment 284, where it connects to an agent and identifies the backend VDA 253 to be connected to. The connection (e.g., a bit-pump connection) to the identified backend VDA 253 can be achieved either with or without an agent. Resiliency may be achieved using a connection lease to establish mutual trust between the client 252 and cloud gateway 281 and agent/connector 264 or VDA 253. The connection lease includes multiple customer environment data centers 284 and agents or VDAs as fallbacks. The connection lease is shared by the client 252 to the gateway service 281/agent/VDA after a proper challenge-response, as discussed further above. Also, the lease contains the VDA 253 thumbprint for anti-theft prevention. After a challenge-response, if an agent or VDA is down or in a degraded mode, the challenge-response starts with the next agent/VDA in the connection lease. Finally, the agent shares a mini-lease which includes the VDA 253 details to which client 252 can connect to for bit-pump connections.

The gateway service 281 generates a token for the client 252 to establish a connection (e.g., a bit-pump connection) if the connection lease exchange is successful. The client 252 can use this token to connect to the backend VDA 253 via any regional gateway service instance. As such, in this implementation there are two tokens involved, the multi-use token used between the VDA 253 and gateway service 281, which is a token to establish a connection therebetween, and another token used to connect the client 252 and gateway service.

While the client 252 tries to establish a communications link (e.g., a bit-pump connection) with the token, it can connect via an agent in the customer environment 284 or connect directly (agentless) to the VDA 253 using the connection (e.g., a persistent connection) established with the VDA via the other token. The connection lease exchange and mutual trust establishment flow can also be agentless. This is because the VDA 253 can support connection leases and a mutual trust sequence in conjunction with direct persistent connection establishment with multi-use token (persistent connection token) support. The cloud gateway service 281 makes agentless connection with the VDA 253 using the VDA UUID in the connection lease exchange. Upon successful completion, the gateway 281 re-uses the same connection (e.g., a transport connection) for communications link (e.g., a bit-pump connection) establishment for the client 252.

The resiliency may also support fallback from one VDA 253 to another when one VDA 253 is down or its operation is otherwise degraded. If operation of a VDA 253 is degraded, or if there is a more suitable VDA, the VDA can be instructed by the broker 260 to respond "Redirect Target" with another VDA UUID to fallback to. The gateway service 281 can then redirect to the other VDA 253 using the above-described agentless method. If operation of a VDA 253 is degraded, it can respond with a "Soft-Deny" or explicit fallback, in which case the gateway service 281 chooses the next VDA from its connection lease.

Figure 16:
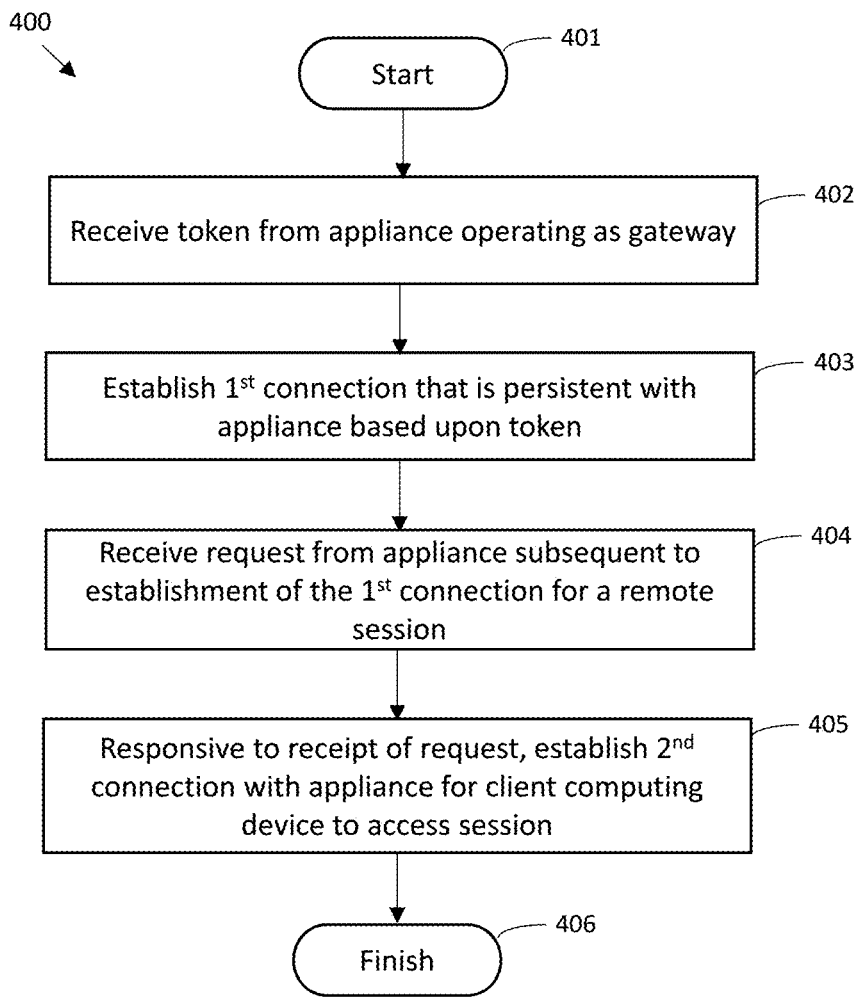
FIG. 16 is a flow diagram illustrating example method aspects associated with the system of FIG. 6.

Referring again to FIG. 6 and also to the flow diagram 400 of FIG. 16, a related method illustratively includes, at the computing device 201, receiving a token from an appliance 205 operating as a gateway between a client computing device 204 and the computing device, at Block 402. The token is generated based upon a key of the computing device 201. The method further illustratively includes establishing a first connection with the appliance 205 based upon the token, at Block 403, with the first connection being persistent, and receiving a request from the appliance via the first connection, at Block 404, with the request to being for a remote session. Responsive to receipt of the request, the computing device 201 establishes a second connection with the appliance 205 that enables the client computing device 204 to access the session, at Block 405. The method of FIG. 16 illustratively concludes at Block 406.

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A method comprising:
at a computing device, receiving a token from an appliance operating as a gateway between a client computing device and the computing device, the token being generated based upon a key of the computing device;
establishing a first connection with the appliance based upon the token, the first connection being persistent;
receiving a request from the appliance via the first connection, the request being for a remote session; and
responsive to receipt of the request, establishing a second connection with the appliance that enables the client computing device to access the session;
wherein the appliance and the computing device are configured to establish connections via a plurality of different networking protocols; and
wherein establishing the second connection comprises establishing the second connection using a same network protocol used for a connection between the client computing device and the appliance.

2. The method of claim 1 wherein the appliance comprises a plurality of appliances distributed across different geographical regions, and wherein establishing comprises establishing the first connection with a first appliance in a geographical region closest to the computing device from among the different geographical regions.

3. The method of claim 2 wherein the client computing device communicates with a second appliance, and wherein establishing comprises establishing the second connection with the second appliance.

4. The method of claim 3 wherein the first and second appliances communicate via a first network overlayed on a second network.

5. The method of claim 1 further comprising, at the computing device, registering the computing device with a broker with which the appliance is also registered; and
wherein receiving comprises receiving the token from the appliance via the broker.

6. The method of claim 1 wherein the token includes a hash of the key for the computing device.

7. The method of claim 1 wherein the appliance comprises a plurality of appliances distributed across different geographical regions; and
further comprising, at the computing device, determining a location of the client computing
device and establishing the second connection with the appliance in a geographical region closest to the determined location from among the different geographical regions.

8. The method of claim 1 further comprising, at the computing device, receiving a connection lease from the client device via the second connection with the appliance, and providing access to computing sessions requested by the client computing device based upon validating the connection lease.

9. A computing device comprising:
a memory and a processor configured to cooperate with the memory to receive a token from an appliance operating as a gateway between a client computing device and the computing device, the token being generated based upon a key of the computing device;
establish a first connection with the appliance based upon the token, the first connection being persistent;

receive a request from the appliance via the first connection, the request being for a remote session; and responsive to receipt of the request, establish a second connection with the appliance that enables the client computing device to access the session;

wherein the appliance and the processor are configured to establish connections via a plurality of different networking protocols; and wherein the processor is configured to establish the second connection using a same network protocol used for a connection between the client computing device and the appliance.

10. The computing device of claim 9 wherein the appliance comprises a plurality of appliances distributed across different geographical regions, and wherein the processor is configured to establish the first connection with a first appliance in a geographical region closest to the computing device from among the different geographical regions.

11. The computing device of claim 10 wherein the client computing device communicates with a second appliance, and wherein the computing device is configured to establish the second connection with the second appliance.

12. The computing device of claim 9 wherein the computing device and the appliance are configured to register with a broker, and wherein the processor is configured to receive the token from the appliance via the broker.

13. The computing device of claim 9 wherein the token includes a hash of the key for the computing device.

14. The computing device of claim 9 wherein the appliance comprises a plurality of appliances distributed across different geographical regions, and wherein the processor is configured to determine a location of the client computing device and establish the second connection with the appliance in a geographical region closest to the determined location from among the different geographical regions.

15. The computing device of claim 9 wherein the computing device is configured to receive a connection lease from the client device via the second connection with the appliance, and provide access to computing sessions requested by the client computing device based upon validating the connection lease.

16. A non-transitory computer-readable medium having computer-executable instructions for causing a computing device to perform steps comprising:

receiving a token from an appliance operating as a gateway between a client computing device and the computing device, the token being generated based upon a key of the computing device;

establishing a first connection with the appliance based upon the token, the first connection being persistent;

receiving a request from the appliance via the first connection, the request being for a remote session; and responsive to receipt of the request, establishing a second connection with the appliance that enables the client computing device to access the session;

wherein the appliance and the computing device are configured to establish connections via a plurality of different networking protocols; and wherein establishing the second connection comprises establishing the second connection using a same network protocol used for a connection between the client computing device and the appliance.

17. The non-transitory computer-readable medium of claim 16 wherein the appliance comprises a plurality of appliances distributed across different geographical regions, and wherein establishing comprises establishing the first connection with a first appliance in a geographical region closest to the computing device from among the different geographical regions.

18. The non-transitory computer-readable medium of claim 16 further having computer-executable instructions for causing the computing device to perform a step of registering the computing device with a broker with which the appliance is also registered; and wherein receiving comprises receiving the token from the appliance via the broker.

* * * * *